Dec. 15, 1936.      C. TIETIG      2,064,326
OIL-FILLED HIGH VOLTAGE CABLE
Filed Feb. 6, 1933
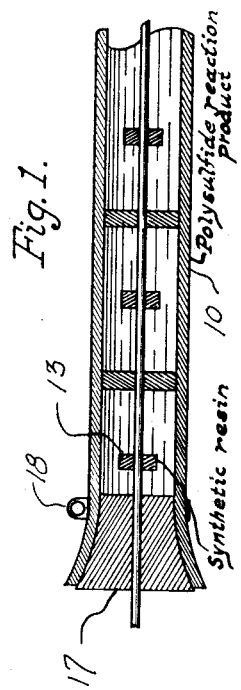
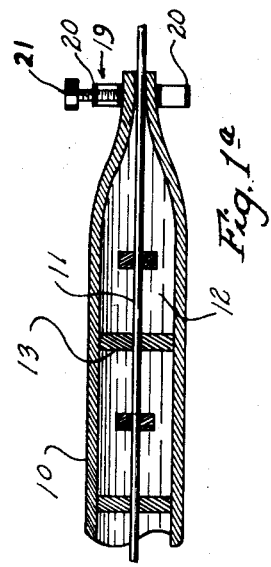
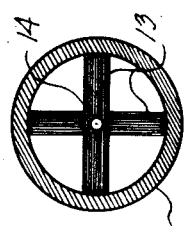
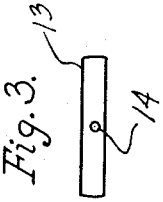
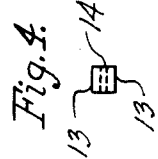
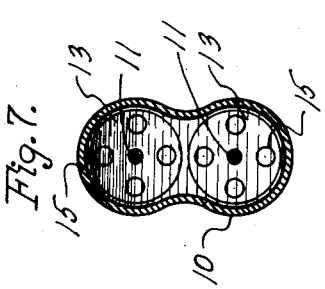
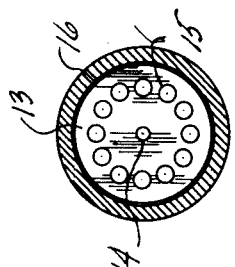
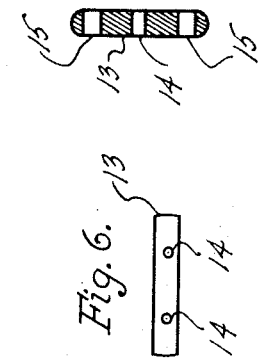
INVENTOR.
Chester Tietig
BY
ATTORNEY.

Patented Dec. 15, 1936

2,064,326

UNITED STATES PATENT OFFICE 2,064,326

OIL-FILLED HIGH VOLTAGE CABLE

Chester Tietig, Covington, Ky., assignor to Kelley-Koett Mfg. Co., Covington, Ky., a corporation of Ohio Application February 6, 1933, Serial No. 655,458

9 Claims. (Cl. 173—264)

This invention relates to an oil-immersed flexible cable which is peculiarly adapted to conditions where extremely high voltages are required and where the requirements for flexibility are high. Such conditions are present in X-ray work and also in radio broadcasting stations.

My invention is intended to meet such conditions and at the same time, if desired to provide a conduit for the free circulation of insulating oil which may elsewhere be used as a combined cooling and insulating medium, for instance in X-ray tubes or radio transmitting tubes. Such use, as applied to an X-ray tube is illustrated and described in my co-pending application Serial No. 649,583 filed December 30th, 1932 which has matured to Patent No. 1,992,335 dated February 26, 1935. This application is a continuation-in-part thereof.

Referring now to the accompanying drawing, Fig. 1 is a sectional longitudinal elevation of my cable, an end being shown with one oil retaining means.

Fig. 1a is a similar section of a form having a modified oil retaining means.

Fig. 2 is a cross sectional view of my cable.

Fig. 3 is a plan view of one of the position fixing beads.

Fig. 4 is an end elevation of a position fixing bead.

Fig. 5 is a cross section of a perforated button.

Fig. 5a is a plan view of the perforated button which may be used in place of beads.

Fig. 6 is a side elevation of a bead such as shown in Fig. 3 except that the bead is perforated to receive two wires.

Fig. 7 is a cross section of a cable according to my invention, adapted to carry, immersed in oil, two conductors of opposite polarity, and to keep them mechanically separated while allowing oil circulation.

Referring again to Fig. 1, 10 is a section of oil proof rubber tubing. It is oil proof because it either consists wholly of, or is lined with one of the two rubber-like substances known respectively as "Thiokol" or as "DuPrene". Throughout this application, I include both of these substances when I use the term "oil proof rubber". These substances do not swell or dissolve in hydrocarbon oils. Their exact chemical composition I do not know but I am informed that "Thiokol" is an olefine polysulfide reaction product and is derived from the interaction of olefins with a soluble polysulfide. "DuPrene" is reported to be a tough elastic rubber-like polymer of a plastic polymer of 2-chloro-buta-1:3 diene.

"Thiokol" is made by the Thiokol Company of Yardville, N. J. and tubing lined with it is made by the DeVilbiss Company of Toledo, Ohio. The E. I. Dupont Company of Wilmington, Del., makes DuPrene.

Traversing the tube 10 centrally is an electrically conducting wire 11, either single or stranded. Surrounding the wire and filling the tube is a filling of high grade transformer oil 12. Strung at spaced intervals on the wire and within the tube 10 are a plurality of beads 13, preferably of Bakelite, but permissibly of glass or porcelain. The beads are arranged alternately horizontally and vertically in order to give the oil free opportunity to circulate and allow the beads to strengthen the tube walls in all directions. The free space is therefore in excess of 50%. The preferred shape of the beads which is that of an elongated cube is shown in Figs. 3 and 4, while their arrangement in the tube is shown in Fig. 2. The beads are merely sections of rectangular rod, the corners of which are rounded. This may be done by tumbling them in a barrel. The wire 11 is strung thru them thru a hole 14 transverse to their sides.

The shape of bead shown in Figs. 3 and 4 is particularly adapted to be molded out of Bakelite or other artificial resin directly onto the wire. Motion of the beads along the wire when the latter is pulled into the tube is then substantially prevented. In Figs. 2, 3, 4, and 5, 14 indicates the hole for the wire, altho it is to be understood that this hole never really exists when the bead is applied to the wire by molding.

Fig. 5 is a perforated button of insulation, preferably of a phenolic condensation product, but permissibly of soft oil proof rubber or of hard rubber. It has also a central hole 14 for the wire and in addition a plurality of perforations for the circulation of oil. If made of hard material, its outer rim is rounded as shown at 16 just as in the case of an ordinary button for clothing. This is to facilitate pulling the wire, with buttons attached by molding thru the rubber tubing, which should be oil-lubricated to assist the process.

Referring again to Figure 1, the closure illustrated on the left hand side comprises an oil-proof rubber stopper 17 which is fitted tightly into the bore of the tube 10 so as to close the end thereof. Encircling the tube and the stopper is an ordinary hose clamp 18. Wire 11 passes directly thru the stopper 17 longitudinally thereto. Before this closure is made, the contacting surfaces are carefully wiped free of oil with a rag wet with gasoline; the joint is then assembled and tightened before oil leaks in so that the stopper will have no tendency to pop out.

On the right hand side of Fig. 1a, 19 is a clamp having flat compression surfaces 20 and a thumb screw 21. Pressure is applied to the end of tube 10 between the surfaces 20 which results in a leakage-tight seal at the end of tube 10, from which seal the wire 11 emerges.

Any other known method of accomplishing the sealing without allowing electrical or fluid leakage may be used.

It lies within the province of my invention to roughen the wire by any known process at spaced intervals or over its entire length in any suitable way to promote a good adhesion of the beads or buttons when these are molded onto the wire.

It is further to be understood that water, particularly distilled water may in some cases where the voltage is not too high, be substituted for oil in my cable. The cable should first be washed out with distilled water before the permanent filling of distilled water is added. This is to insure that the permanent filling will remain clean, and consequently of high dielectric strength.

The term "oil proof rubber tube" as used in this application includes both tubes lined with oil proof rubber and tubes made wholly of oil proof rubber.

Among the modifications which may be made in this invention without departing from its spirit is to use more than one conductor in the oil and tube. This involves, for lower voltage work, merely stringing two wires in place of one thru a double holed bead as shown in Fig. 6. Such a construction is not adapted however, for the extreme of high voltages which the single conductor cable can handle. Even more conductors may be accommodated in the button as shown in Fig. 6 by stringing wires thru some of the perforations while leaving others empty.

For high voltage double conductor work, the form shown in Fig. 7 is preferable. It comprises an oil-proof jacket 10, the shape of which is, in cross section, two side by side cylinders, the adjoining walls of which have been eliminated and the remaining walls merged. This gives a more or less hour-glass shaped section such as Fig. 7 shows. In each semi circular portion of the tube or jacket 10, there is a conductor 11 approximately centered therein by being strung thru the center of a button 13 similar to that shown in Fig. 5. These are preferably made of soft rubber. The contour of the jacket is such that it does not permit the buttons quite to touch each other. The buttons also have edge perforations 15 to allow circulation of the oil that fills the jacket 10.

Closure of such double cable may be made with an oil-proof rubber stopper in a manner similar to that shown on the left side of Fig. 1 except that the stopper and clamps are shaped to fit the hole to be plugged. A clamp such as 20 may also be used.

While I have indicated closed ends for my cables it is to be understood that I prefer to use them in connection with oil circulating systems, i. e. attached to a reservoir and pump, so that oil may be pumped thru them and the apparatus to which they may be attached so as to cool both such apparatus and the conductor.

It is to be understood that all forms of my cable may be armored on the outside with a flexible conducting metal sheath which is grounded. No novelty is claimed for this feature, which partakes of well-known practice.

I claim as my invention:—

1. An insulated electrical cable comprising a central metallic conducting wire, insulating oil surrounding said wire, an oil proof rubber substitute tube surrounding said insulating oil and wire and a plurality of beads of high dielectric strength material on said wire at spaced intervals, said beads being arranged to center the wire inside the rubber tube, to support the walls of the tube and to offer little resistance to the circulation of oil in the tube.

2. A cable according to claim 1 in which the beads are in the form of round multi-perforated buttons.

3. A cable according to claim 1 in which the beads made of synthetic resin are firmly attached to the wire by molding.

4. A cable according to claim 1 in which the wire is roughened and the beads are firmly attached to it by molding.

5. A combination electrical cable and cooling hose comprising an outer flexible oil-proof, non-metallic, non-conducting tube, a central bare metallic conductor, a plurality of spacing beads attached to said conductor at substantial intervals, said beads obstructing less than 50% of the bore of said tube and being arranged to hold said conductor approximately equi-distant from the sides of said tube, and a filling of insulating oil in said tube.

6. A combination electrical cable and cooling hose comprising an outer sheath or tube of flexible non-metallic, non-conducting oil-proof material, a central bare metallic conductor, a plurality of spacing beads on said conductor at substantial intervals, the shape of said beads being rectangular and each one being arranged at approximately right angles to its neighbors, said beads being made of insulating material, and a filling of insulating oil in said tube.

7. An insulated electrical cable which comprises a central metallic conducting wire, a substantial body of insulating liquid, capable of being circulated along said conductor surrounding said conductor, a plurality of multi-perforated insulating spacing disks at substantially right angles to said conductor at intervals along said conductor, and surrounding said conductor and said disks and touching the edges of the latter, a sheath of substantial thickness, great flexibility and high di-electric strength and resistance to chemical attack of mineral oil, the material of said sheath comprising a tough elastic rubber-like polymer of a plastic polymer of 2-chloro-buta-1:3 diene.

8. An insulated electrical cable which comprises a central metallic conducting wire, a substantial body of insulating liquid, capable of being circulated along said conductor surrounding said conductor, a plurality of multi-perforated insulating spacing disks at substantially right angles to said conductor at intervals along said conductor, and surrounding said conductor and said disks and touching the edges of the latter, a sheath of substantial thickness, great flexibility and high di-electric strength and resistance to chemical attack of mineral oil, the material of said sheath comprising an olefine polysulfide reaction product.

9. In combination, a centrally arranged conducting wire, a plurality of spacers each in the shape of a section of rectangular rod having rounded ends of artificial resin molded on said wire at spaced intervals, said wire passing through the middle of the longer axis of said spacers, each of said spacers being arranged at substantially right angles to the plane upon which its neighbor is arranged, a tube of elastic, flexible oil-proof mechanically strong material of high dielectric strength surrounding said conductor at a distance therefrom and contacting the outer ends of said spacers, and a filling of mobile insulating oil in said tube and surrounding said conductor.

CHESTER TIETIG.